US006832256B1

(12) United States Patent
Toga

(10) Patent No.: US 6,832,256 B1
(45) Date of Patent: *Dec. 14, 2004

(54) FIREWALLS THAT FILTER BASED UPON PROTOCOL COMMANDS

(75) Inventor: James E. Toga, Portland, OR (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 685 days.

(21) Appl. No.: 08/773,692

(22) Filed: Dec. 27, 1996

(51) Int. Cl.[7] .............................................. G06F 15/16
(52) U.S. Cl. ...................... 709/229; 709/224; 709/230; 713/201
(58) Field of Search ..................... 395/200.59, 187.01, 395/200.79; 709/229, 249, 227, 224, 230; 713/201

(56) References Cited

U.S. PATENT DOCUMENTS

| | | | | |
|---|---|---|---|---|
| 5,550,984 A | * | 8/1996 | Gelb | 709/249 |
| 5,623,601 A | * | 4/1997 | Vu | 713/201 |
| 5,678,041 A | * | 10/1997 | Baker et al. | 709/229 |
| 5,699,513 A | * | 12/1997 | Feigen et al. | 713/201 |
| 5,706,507 A | | 1/1998 | Schloss | 395/615 |
| 5,727,129 A | | 3/1998 | Barrett et al. | 395/12 |
| 5,752,242 A | | 5/1998 | Havens | 707/3 |
| 5,778,174 A | * | 7/1998 | Cain | 713/201 |
| 5,835,726 A | * | 11/1998 | Shwed et al. | 709/229 |
| 5,958,015 A | * | 9/1999 | Dascalu | 709/229 |

OTHER PUBLICATIONS

Comer (Internetworking with TCP/IP vol. 1: Principles, Protocols, and Architecture), pp. 142–144 and p. 579, 1995.*
Comer (Internetworking with TCP/IP vol. 1 : Principles, Protocols, and Architecture), pp. 142–144 and p. 579, 1995.*
Comer (Internetworking with TCP/IP vol. 1 : Principles, Protocols, and Architecture), pp. 142–144, 1995.*
Graham, "HTML Sourcebook, A Complete Guide to HTML 3.0", Second Edition, Table of Contents, Chp. 3, pp. 91–123, Bhps. 6–8, pp. 351–450, Wiley Computer Publishing.
Coner, "Internetworking with TCP/IP vol. 1: Protocols, and Architecture", pp. 142–144.

* cited by examiner

Primary Examiner—Hosain Alam
Assistant Examiner—Philip B. Tran
(74) Attorney, Agent, or Firm—Blakely, Sokoloff, Taylor & Zafman LLP

(57) ABSTRACT

Data transfer is controlled between a first network and a second network of computers by a firewall-proxy combination. Active interpretation of protocol commands exchanged between the first network and the second network is performed to determine specific actions concerning completion of the protocol request. This active firewall-proxy combination may exist on either the first or second network of computers. This method of control provides centralized control and administration for all potentially reachable resources within a network.

25 Claims, 2 Drawing Sheets

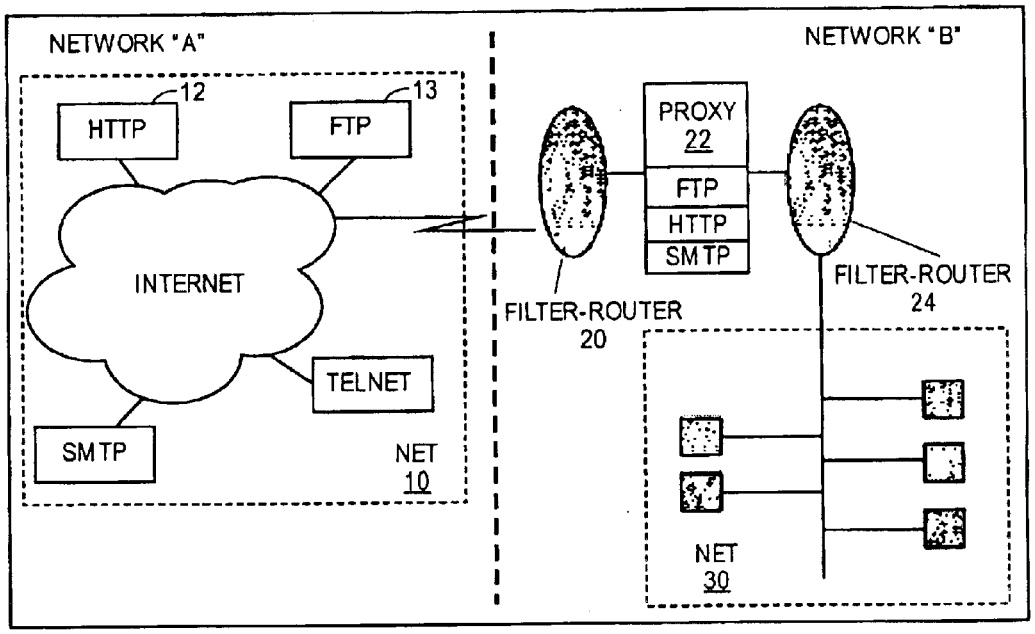

FIG. 1

Protocol Command examples that can be parsed

FTP:
    PORT - specifies the address on which data transfer is to take place
    RETR - retrieve or 'get' a file
    STOR - store or 'pu' a file to a remote site
    LIST - list detail about a particular file or directory of files SMTP:
    EXPN - Expand the contents of a mail list no individual entries
    TURN - reverse the roles of sender and recipient of email
    MAIL - command to send the body of a mail message
    RCPT - specifies the recipient of a mail message HTTP:
    GET - get some data HTML or Medadata
    ACCEPT - modifier to GET command, specifies acceptable formats of data
    POST - send some data (may be from client to server - i.e. a password)
    FROM - argument to the POST command specifies the sender of the command

FIG. 2

FIREWALLS THAT FILTER BASED UPON PROTOCOL COMMANDS

FIELD OF THE INVENTION

The present invention relates to the field of providing information over a network. More particularly, this invention relates to selectively controlling data transferred between two networks based upon protocol commands.

BACKGROUND OF THE INVENTION

The Internet is comprised of many computers communicating in a standardized manner. These communications are standardized to allow applications to interoperate on behalf of the users. Client applications may communicate with other client applications or communicate with servers to get access to resources on the network. These resources may include anything from actual file data, to computational resources, to communications channels. The internet applications use these standardized protocols or methods of communications so that independently developed and deployed computers programs may work together across a campus or continent.

The Internet has many standardized protocols for accomplishing various computerized tasks. File Transfer Protocol (FTP) is utilized to move files and manipulate file systems from locations remote to the data. These files may consist of any type of data that the native file system can store. The Remote Terminal Protocol (Telnet) is used to access another computer from a remote location, but to provide the same functionality that a user would have if they were locally connected. Simple Mail Transfer Protocol (SMTP) is used to exchange email between computers. As a final example, Hypertext Transfer Protocol (HTTP) is the protocol that is used on the World Wide Web to exchange text and richer multimedia enhanced information.

A firewall is used to separate one network of computers from another. For example, a corporation that connects its internal Intranet, to the Internet may install a firewall to prevent users outside the corporation from arbitrarily accessing data stored on the computer network within the corporation. Additionally, the firewall can prevent users within the corporation from providing inappropriate data out to the Internet.

A Firewall is a specially configured computer that can interrupt the flow of communications between two or more computers. A Firewall can interpret the lower level addressing information on the communications and decide whether or not to let to the transaction complete. This addressing information may control which physical machines may be interconnected. For finer grained control, the ability to address specific applications running on a computer may also be arbitrated. This provides a secure, but relatively coarse level of access control for corporate Intranets.

A Proxy sits on top of a firewall; Proxies look at a higher level of the communications than the Firewall normally does. It is typically a process that responds and acts on behalf of, client requests. Proxies understand and have the ability to interpret the protocol that is exchanged between the opposing sides of the application. A Proxy may be used to improve performance by caching data from previous retrievals. A Proxy may look at the initial protocol requests from the communicating applications to verify their authenticity and then signal the Firewall to allow communications to proceed. In this manner, once a 'session' is created, no further interpretation is needed.

SUMMARY OF THE INVENTION

A method of controlling data transfer between a first network and a second network of computers is described. Active interpretation of protocol commands exchanged between the first network and the second network is done, to determine specific actions concerning completion of the protocol request. This active firewall-proxy combination may exist on either the first or second network of computers. This method of control provides centralized control and administration for all potentially reachable resources within a network.

These and other advantages of the present invention are fully described in the following detailed description.

BRIEF DESCRIPTION OF THE DRAWINGS

FIG. 1 is a block diagram of a firewall/proxy separating a first network from a second network of computers.

FIG. 2 includes various protocol commands that might be interpreted by a proxy.

DETAILED DESCRIPTION

Figure 3:
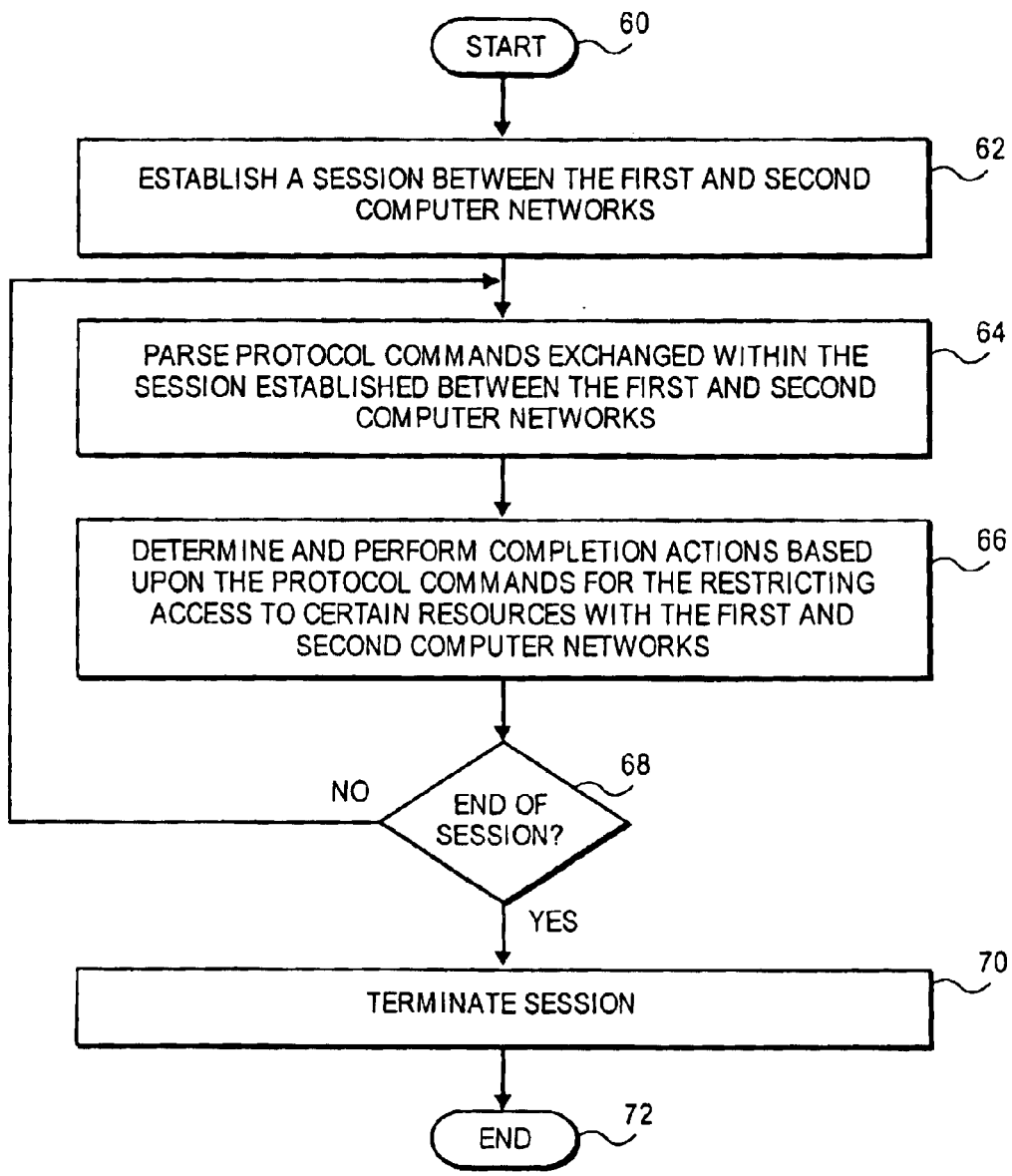
FIG. 3 shows a flowchart of the steps taken using the present invention.

A method of controlling application communications and data transfer between a first network and a second network of computers is described. Protocol exchanges, such as File Transfer Protocol (FTP) or Hypertext Transfer Protocol (HTTP), received from the first network by the second network is parsed and interpreted to determine requests within the application protocol. The second network of computers makes a completion decision as to whether to allow the command(s) based on the protocol information. The second network of computers may allow complete exchange or partial exchange between the application(s). The second network of computers may deny the exchange until a later time, or it may cache the exchange to allow its clients to access the data from this transfer without the need to retrieve the data a second time from the first network. Various other completion decisions based upon resource constraints, specific rights of the user are also possible.

FIG. 1 is a block diagram of a firewall/proxy separating a first network from a second network of computers. The first network, network A, is the Internet 10 which includes the many host computers and its many HTTP, SMTP, FTP and Telnet sites, such as WEB site 12 and FTP site 13.

Network A is coupled to Network B, which may be a corporate network of computers, for example. In one embodiment, Network B comprises a first filtering router 20, a proxy 22, and a second filtering router 24. Additionally, Network B may host a number of services such as FTP and WEB that are accessible to Network A. Network B may also host many other client computers 30 connected to its network.

The filtering router 20 is connected to the Internet 10. The filtering router 20 accepts only requests with source addresses from the proxy 22 for destinations of the Internet 10. The filtering router 20 also only allows protocol messages received from the Internet 10 that are addressed for proxy 22.

Similarly, the filtering router 24 is connected to the client computers 30. The filtering router 24 accepts requests from the client computers 30 only directed to the proxy 22. The filtering router 24 also only allows data from the proxy 22 to be provided to the client computers 30.

The Proxy 22 sits between the filtering routers 20 and 24. Thus, the proxy controls the client computers 30 from accessing the Internet 10 directly. The proxy is able to monitor all protocol exchanges between Network B and Network A.

In the prior art, the proxy 22 receives a connection request via filtering router 24 from one of its clients to initiate a protocol exchange from the Internet. The proxy requests the data from the Internet which is allowed to pass through the filtering router 20. When the request response is returned from the Internet, the filtering router 20 allows the message to be provided to the proxy 22. The proxy then provides the message to the client 30 that originated the request. Thus, the completion of any exchange is managed in a centralized, but universal manner, by the proxy 22.

In the present invention, the proxy 22 actively monitors and interprets the protocol exchanges that occur between the Internet. The proxy looks at session information and specific commands that may be used during the protocol exchange about the content of the data, as will be described further with reference to FIG. 2. The proxy then determines completion decisions as to whether to allow the command to complete based upon the information within the protocol. The decision can be completely dynamic, based upon the current parties and environment active at that point in time. For example, the proxy may allow complete transfer or partial transfer of the data within FTP, depending on the text mode that has been set by the client. It may defer the transfer until a later time, or it may cache the file to allow its clients to access the file from this transfer without the need to retrieve the file a second time from the Internet. Various other completion decisions based upon resource constraints, specific rights of the user, and exact protocol commands are possible, as will be described.

In contrast, in the prior art, a proxy typically allowed or disallowed an entire session. Thus, either access was completely allowed between a client computer on the first computer network and another computer on the second computer network, or the access was completely disallowed. Decision making was not performed dynamically during ongoing protocol exchanges.

The proxy 22 may be comprised of one or more computers. Additionally, proxy 22 may comprise other proxies which communicate with the Internet, such as the previously listed SMTP, HTTP, and Telnet proxies. Proxy 22 processes the requests from the client computers 30 and the responses received from the Internet 10.

FIG. 2 includes various protocol commands that might be interpreted by a proxy. This is not meant to be an exhaustive list, and may be extended to include future protocol commands. During certain times of the day the Network B may disallow transfer of files over a specified size, or may prevent the transfer of binary or picture files to a particular system. At other times of the day, these transfers will be allowed. These restrictions may be based upon resource constraints of the network during peak hours during which normal business over the Network B would become too slow without the restrictions.

Certain users, however, may be allowed access to files of any size or type at any time of the day. The Proxy uses access rights associated with a user, to appropriately determine completion actions whether to allow the transfer. In this manner, communications and information exchanges can be controlled in a centralized fashion.

Miscellaneous Protocol Controls

Other protocol information that can be used by the proxy to make completion decisions include specific recipients of data, auxiliary connections that might be needed or extended searching mechanisms. The proxy can access information about the users on its client systems which allows the proxy to determine whether certain users should be allowed to complete protocol transactions in particular situations. The proxy may also store information about certain destination sites and disallow certain types of accesses based upon the destination site.

FIG. 3 shows a flowchart of the steps taken using the present invention. The flowchart starts at block 60 from which it continues at block 62. At block 62, a session between the first and second computer networks is established. The session may be initiated by a client computer in net 30. For example, the client computer may request access to an internet site via the proxy 22. The proxy 22, in response, establishes the session with the internet site. A session may also be established from an internet site requesting from the proxy access to a client server in net 30.

The flowchart continues at block 64, at which the protocol commands exchanged within the session established between the first and second computer networks are parsed, or interpreted.

The flowchart continues at block 66, at which completion actions are determined based upon the protocol commands for restricting access to certain resources within the first and second computer networks.

The flowchart continues at block 68. If it is the end of the session, then operation continues at block 70, at which the session terminates, otherwise, operation returns to block 64 at which protocol commands are continued to be parsed. From block 70, the flowchart terminates at block 72.

Specific Examples

Some examples may help clarify possible uses of the invention. In a first example, a session is established originating from a client computer on net 30 via the proxy to a FTP site on the internet. FTP allows transfer in a text mode and in a binary mode. In one case, the proxy parses the command protocol stream to prevent a switch from one mode to the other initiated by the client computer. In another case, the proxy disallows the data being retrieved in one of the FTP modes. These restrictions may be based upon attributes of the client computer, the user of the client computer, or the FTP site. It may also be based upon the time of day or other resource constraints.

In a second example, a session is established via a SMTP protocol. Within the SMTP protocol, an EXPN command allows access to mailing list information. The proxy may restrict the EXPN command from being transferred between the two networks based upon predetermined rules which are stored within the proxy. Alternatively, the proxy may interpret the SMTP stream of commands to disallow email from a particular sender to be accepted for a particular recipient.

In a third example, a session is established between a client computer in net 30 and an internet web site via the HTTP protocol. The proxy may allow commands from the client computer to read from the web site; however, the proxy may disallow posts (or writes) to the web site.

In the foregoing specification, the invention has been described with reference to specific exemplary embodiments thereof. It will, however be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method of controlling data transfers between a first and a second computer network, the method comprising:

monitoring protocol commands by a proxy coupled between the first and second computer networks;

interpreting protocol commands exchanged between the first and second computer networks;

determining the type of protocol being used; and restricting access to certain resources within the first and second computer networks based on the type of communications protocol being used and the type of protocol commands exchanged between the first and second computer networks, wherein restricting access is determined dynamically based on environmental changes.

2. The method of claim 1 wherein the restricting access is further based upon network resource constraints of the first and second computer networks.

3. The method of claim 1 wherein the type of communications protocol used between the first and second computer networks includes at least one of the following protocols; Hypertext Transfer Protocol (http), Simple Mail Transfer Protocol (SMTP), Remote Terminal Protocol (Telnet), and File Transfer Protocol (FTP).

4. The method of claim 1 wherein the restricting access is additionally based upon access privileges of a requester of the data transfers.

5. The method of claim 1 wherein the restricting access is additionally based upon a time of day restriction.

6. The method of claim 1 wherein the exchanged protocol commands dynamically determine whether subsequent data transfers are allowed to occur.

7. A method of controlling data transfers between a first computer network and a second computer network, the first computer network includes a client computer and a firewall comprised of two routers and a proxy, the method comprising:

monitoring actively by a proxy reviewing protocol commands;

receiving by the proxy a request from the client computer to establish a session with the second computer network;

establishing a session with the second computer network by the proxy;

receiving protocol commands after a session is begun by the proxy from the client computer;

determining the type of protocol being used;

selectively allowing certain protocol commands to be transmitted to the second computer network based upon predetermined rules stored within the proxy, wherein said predetermined rules selected based upon the type of protocol being used, and allowing certain protocol commands is dynamically determined based on environmental changes; and determining completion actions based upon the transmitted protocol commands.

8. The method of claim 7 wherein the selectively allowing only certain protocol commands to be transmitted to the second computer network is based upon a mode of the data transfers.

9. The method of claim 7 wherein the selectively allowing the protocol commands to be transmitted to the second computer network is based upon network resource constraints of the first computer network.

10. The method of claim 7 wherein the selectively allowing the protocol commands to be transmitted to the second computer network is based upon access attributes associated with a source of the protocol commands.

11. The method of claim 7 wherein the selectively allowing the protocol commands to be transmitted to the second computer network is based upon access attributes associated with a destination of the protocol commands.

12. The method of claim 7 wherein the transmitted protocol commands dynamically determine whether subsequent data transfers are allowed to occur.

13. A method of controlling data transfers between a first computer network and a second computer network, the first computer network includes a client computer and a firewall comprised of two routers and a proxy, the method comprising:

monitoring actively by a proxy reviewing protocol commands;

receiving by the proxy a request from the client computer to establish a session with the second computer network;

establishing a session with the second computer network by the proxy;

receiving protocol commands by the proxy after a session is begun from the second computer network;

determining the type of protocol being used;

filtering the protocol commands to allow only certain of the protocol commands to be transmitted to the client computer based upon predetermined rules stored within the proxy, wherein said predetermined rules selected based upon the type of protocol being used, and filtering the protocol commands is dynamically determined based on environmental changes; and determining completion actions based upon the transmitted protocol commands.

14. The method of claim 13 wherein the filtering the protocol commands is based upon a mode of the data transfer.

15. The method of claim 13 wherein the filtering the protocol commands is based upon resource constraints of the first computer network.

16. The method of claim 13 wherein the filtering the protocol commands is based upon access attributes associated with a source of the protocol commands.

17. The method of claim 13 wherein the filtering the protocol commands is based upon access attributes associated with a destination of the protocol commands.

18. The method of claim 13 wherein the transmitted protocol commands dynamically determine whether subsequent data transfers are allowed to occur.

19. A computer-readable medium comprising program instructions for controlling data transfers between a first computer network and a second computer network by performing the following:

monitoring protocol commands;

interpreting protocol commands exchanged between the first and second computer networks;

determining completion actions based upon the type of communications protocol being used and the exchanged interpreted protocol commands for restricting access to certain resources within the first and second computer networks.

20. The computer-readable medium of claim 19 wherein the completion actions dynamically determine whether subsequent data transfers are allowed to occur.

21. An apparatus for controlling data transfer between a first and a second computer network, the apparatus comprising:

a proxy server;

a first filter-router coupled between the first computer network and said proxy server;

a second filter-router coupled between the second computer network and said proxy server; and wherein said proxy server monitors and interprets exchanged protocol commands between the first and second computer networks after a session is begun to determine completion actions based upon the type of communications protocol being used and the type of protocol commands exchanged between the first and second networks.

22. The apparatus of claim 21 wherein the completion actions dynamically determine whether subsequent data transfers are allowed to occur.

23. The apparatus of claim 21 wherein the proxy server determines the completion actions based upon network resource constraints of the first and second computer networks.

24. The apparatus of claim 21 wherein the proxy server allows partial data transfers based upon the exchanged protocol commands.

25. The apparatus of claim 21 wherein the type of communications protocol used between the first and second computer networks includes at least one of the following protocols; Hypertext Transfer Protocol (HTTP), Simple Mail Transfer Protocol (SMTP), Remote Terminal Protocol (Telnet), and File Transfer Protocol (FTP).

* * * * *

UNITED STATES PATENT AND TRADEMARK OFFICE
CERTIFICATE OF CORRECTION

PATENT NO. : 6,832,256 B1
DATED : December 14, 2004
INVENTOR(S) : Toga

It is certified that error appears in the above-identified patent and that said Letters Patent is hereby corrected as shown below:

Column 6,
Line 59, after "networks", insert -- , wherein restricting access is determined dynamically based on environmental changes --.

Column 7,
Line 11, after "networks", insert -- , wherein the determination of completion actions is dynamic based on environmental changes --.

Signed and Sealed this

Twenty-fourth Day of May, 2005

JON W. DUDAS
*Director of the United States Patent and Trademark Office*